US009819043B2

United States Patent
Kernene

(10) Patent No.: US 9,819,043 B2
(45) Date of Patent: Nov. 14, 2017

(54) SYSTEM AND METHOD FOR HYDROGEN-BASED ENERGY SOURCE

(75) Inventor: Nicolas Kernene, St. Charles, IL (US)

(73) Assignee: TWISTED SUN INNOVATIONS, INC., St. Charles, IL (US)

( * ) Notice: Subject to any disclaimer, the term of this patent is extended or adjusted under 35 U.S.C. 154(b) by 321 days.

(21) Appl. No.: 12/069,699

(22) Filed: Feb. 11, 2008

(65) Prior Publication Data
US 2008/0233440 A1 Sep. 25, 2008

Related U.S. Application Data

(60) Provisional application No. 60/889,107, filed on Feb. 9, 2007.

(51) Int. Cl.
| | |
|---|---|
| *H01M 8/04* | (2016.01) |
| *H01M 8/22* | (2006.01) |
| *H01M 8/18* | (2006.01) |
| *H01M 8/0656* | (2016.01) |
| *H01M 16/00* | (2006.01) |

(52) U.S. Cl.
CPC ......... *H01M 8/186* (2013.01); *H01M 8/0656* (2013.01); *H01M 16/003* (2013.01); *Y02E 60/528* (2013.01)

(58) Field of Classification Search
CPC ... H01M 16/003; H01M 8/0656; H01M 8/186
USPC .................................................. 429/17, 414
See application file for complete search history.

(56) References Cited

U.S. PATENT DOCUMENTS

| | | | | |
|---|---|---|---|---|
| 4,237,386 A | * | 12/1980 | Instance ................. | H01R 27/02 200/51.1 |
| 5,114,352 A | * | 5/1992 | Gahagen ................ | H01R 39/64 439/22 |
| 5,759,712 A | * | 6/1998 | Hockaday ...................... | 429/423 |
| 5,760,488 A | | 6/1998 | Sonntag | |
| 6,309,521 B1 | * | 10/2001 | Andrews .................. | C25B 1/13 204/252 |
| 2001/0026777 A1 | * | 10/2001 | Negishi .................. | B01B 1/005 422/112 |
| 2002/0177018 A1 | * | 11/2002 | Fuglevand ...................... | 429/22 |
| 2003/0091889 A1 | * | 5/2003 | Sotomura et al. .............. | 429/40 |
| 2003/0215680 A1 | * | 11/2003 | Lillis et al. ..................... | 429/21 |
| 2004/0124711 A1 | * | 7/2004 | Muchow et al. ............... | 307/64 |

(Continued)

OTHER PUBLICATIONS

Search Report and Written Opinion in corresponding International Application No. PCT/US2008/001855 dated Jul. 18, 2008.

*Primary Examiner* — Emily Le
*Assistant Examiner* — Brent Thomas
(74) *Attorney, Agent, or Firm* — Husch Blackwell LLP

(57) ABSTRACT

A fuel cell system is disclosed that comprises a fuel cell unit operable to store at least one of water and hydrogen. At least one membrane is provided at one or more ends of the fuel cell unit. The membrane is operable to enable a flow of oxygen through the at least a portion of fuel cell unit. Further, the membrane is further operable to prevent water from flowing through at least a portion of the fuel cell. Moreover, an electrical source in operative engagement with the fuel cell unit. The fuel cell operates in a first mode to collect the hydrogen when receiving voltage from the electrical source, and further the fuel cell operates in a second mode to generate electricity using the hydrogen. The fuel cell unit is preferably stackable via a combination of conductible studs and receptacles.

14 Claims, 7 Drawing Sheets

(56) References Cited

U.S. PATENT DOCUMENTS

2006/0156627 A1\* 7/2006 Brantley et al. ................. 48/61
2008/0032174 A1 2/2008 Fuglevand et al.
2012/0225362 A1\* 9/2012 Kernene ....................... 429/411

\* cited by examiner

SYSTEM AND METHOD FOR HYDROGEN-BASED ENERGY SOURCE

CROSS-REFERENCE TO RELATED APPLICATION

This application is based on and claims priority to U.S. Provisional Patent Application Ser. No. 60/889,107, filed on Feb. 9, 2007 and entitled SYSTEM AND METHOD FOR HYDROGEN-BASED ENERGY SOURCE, the entire contents of which is hereby incorporated by reference.

BACKGROUND

Field of the Invention

The present invention relates generally to energy, and, more particularly, to a fuel cell medium that provides electricity, for example, in remote locations.

Description of the Related Art

Producing electricity from hydrogen is known. In known applications, an electrolyzer is used for producing a source of hydrogen from water. As known in the art, hydrogen and oxygen are produced by electrolysis of water. A water electrolysis reaction occurs when sufficient energy is applied to break the water's oxygen-hydrogen-bond.

As known in the art, electrolysis includes an electrochemical process involving the decomposition of an electrolyte. During electrolysis, an electrolyte decomposes when an external DC voltage is applied to two electrodes, i.e., an anode and a cathode, which are in contact with the electrolyte. The voltage equals or exceeds a threshold value, which, depending upon the particular electrolyte, causes the electrolyte to decompose and the hydrogen-water bond to break. The minimum voltage necessary to decompose the electrolyte is referred to as the "decomposition voltage."

Furthermore and as known in the art, some proton exchange-membrane or polymer electrolyte membrane ("PEM") electrolyzers enable the production of hydrogen and oxygen through the electrolysis of water. PEM electrolyzers include electrolyte material, which includes a proton-conducting polymer membrane. When the membrane becomes wet, sulfonic acid attached thereto detaches, and the membrane becomes acidic and proton-conducting. Protons, i.e., positively charged hydrogen ions, pass through the membrane, while anions, i.e., negatively charged ions, do not pass through the membrane.

Thus and as known in the art, PEM electrolyzers separate pure water into hydrogen and oxygen when a DC voltage is applied to electrodes (i.e., cathode and anode) provided with the PEM electrolyzers. When the DC voltage exceeds the decomposition voltage, the electrolyzer splits pure water into hydrogen and oxygen.

Also and as known in the art, fuel cell technology allows the use of hydrogen as fuel to produce electricity. For example, hydrogen collected as a function of PEM electrolyzers is used in fuel cells. Moreover, several individual fuel cells are combinable in a unit, referred to in the art as a "fuel cell stack." A fuel cell stack is desirable to achieve an appreciable output voltage and/or current. Thus, in order to achieve appreciable output voltages, several individual fuel cells must be combined in a unit called a fuel cell stack.

Adjacent fuel cells can be connected by a separator, which may be formed as a plate. The plate is operable to provide electrical connections between the respective fuel cells. Also, the plates can provide a gas transport towards and away from the respective fuel cells. Further heat that is produced by the respective fuel cells can be dissipated by the separator plate. Moreover, adjacent cells can be sealed by the separator plate, thereby preventing fuel and oxidant leakage.

In some known electrolyzers, plates are attached to the ends of a fuel cell stack. The plates are operable to electrically connect one or more external circuits and can also provide connections for gas flow. Due to production of heat, one or more fuel stack may be further provided with cooling, including by air or water.

In known hydrogen-based fuel cells, electrical production occurs as a function of hydrogen atoms contacting the plate, effectively taking electrons from the hydrogen atoms and producing free electrons. Hydrogen generally exists in nature as di-hydrogen ($H^2$) molecules. Every two di-hydrogen molecules ($2H^2$) are include 4 hydrogen protons and 4 free electrons of potential energy ($4H^+ + 4e^-$). Further and as known, oxygen atoms are attracted to the positively charged hydrogen protons ($4H^+$) due to the lone pair of electrons on the outer shell of oxygen. Oxygen exists in nature as di-oxygen ($O^2$) molecules. The oxygen atoms bond with the hydrogen protons, thereby producing atoms of water and leaving the free electrons, thereby generating electricity ($4H^+ + 4e^- + O^2 -> 4H^+ + O^2 + 4e^- -> 2H^2O + 4e-$).

Also in known electrolyzers, a respective number of individual fuel cells determines a particular output voltage. The cells are electrically connected in series, such that the addition or subtraction of a fuel increases or decreases the output voltage, respectively. As known, the total output voltage is determined by the sum of the each fuel cell's output voltage.

Further, it is known to store hydrogen as a metal hydride, for example, in the crystal lattice of certain metals or metal alloys. As known in the art, an exothermic (heat producing) reaction occurs when hydrogen bonds to the metal (or alloy) to form a metal hydride, and the hydrogen is stored. By applying heat to a metal hydride, the hydrogen is releasable and, thereafter, usable in a fuel cell.

Storing hydrogen as a metal hydride is a preferred way to store hydrogen as it is believed to be safer and easier to handle. Further, a small volume of metal hydride is operable to store a considerable amount of hydrogen and sufficient to provide a considerable amount of fuel to produce electricity. A known shortcoming of storing metal hydride for the production of electricity is that the energy storage density per mass is low and, therefore, the storage tanks are considerably heavy.

SUMMARY

In a preferred embodiment, a fuel cell system is disclosed that comprises a fuel cell unit operable to store at least one of water and hydrogen. Further, at least one membrane is provided at one or more ends of the fuel cell unit. The membrane is operable to enable a flow of oxygen through at least a portion of fuel cell unit. Further, the membrane is further operable to prevent water from flowing through at least a portion of the fuel cell. The system includes an electrical source in operative engagement with the fuel cell unit. The fuel cell operates in a first mode to collect the hydrogen when receiving voltage from the electrical source, and further the fuel cell operates in a second mode to generate electricity using the hydrogen.

In an example embodiment, the fuel cell system further includes at least one stud that is coupled to a first fuel cell unit and at least one receptacle coupled to a second fuel cell unit. The receptacle from the second fuel cell unit is operable to receive the stud from the first fuel cell unit thereby joining the first and second fuel cell units and enabling the first and second fuel cell units to operate in tandem. Further the fuel cell system the at least one stud and at least one receptacle are formed of a conductive material.

In an example embodiment, a plurality of the fuel cell units are joined by a plurality of respective studs and respective receptacles. The plurality of fuel cell units are operable in parallel or in serial fashion. Preferably, one of the studs is operable for a positively charged connection and one of the other studs is operable for a negatively charged connection.

In an example embodiment, the at least one stud and at least one receptacle are operable for a user to select a particular polarity. Further, at least one of the at least one stud and the at least one receptacle is formed of a resilient material.

Other features and advantages will become apparent from the following description that refers to the accompanying drawings.

BRIEF DESCRIPTION OF THE DRAWINGS

For the purpose of illustration, there is shown in the drawings a form which is presently preferred, it being understood, however, that the invention is not limited to the precise arrangements and instrumentalities shown. The features and advantages of the teachings herein will become apparent from the following description that refers to the accompanying drawings, in which.

DESCRIPTION OF EMBODIMENTS

Figure 1:
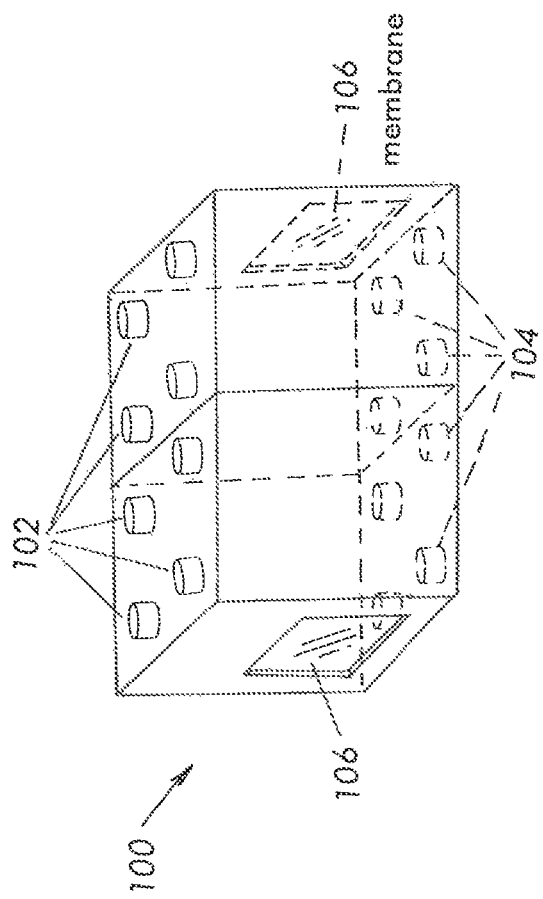
FIG. 1 is a perspective view and illustrates a hydrogen fuel energy unit in accordance with a preferred or example embodiment ("preferred embodiment")
Figure 1A:
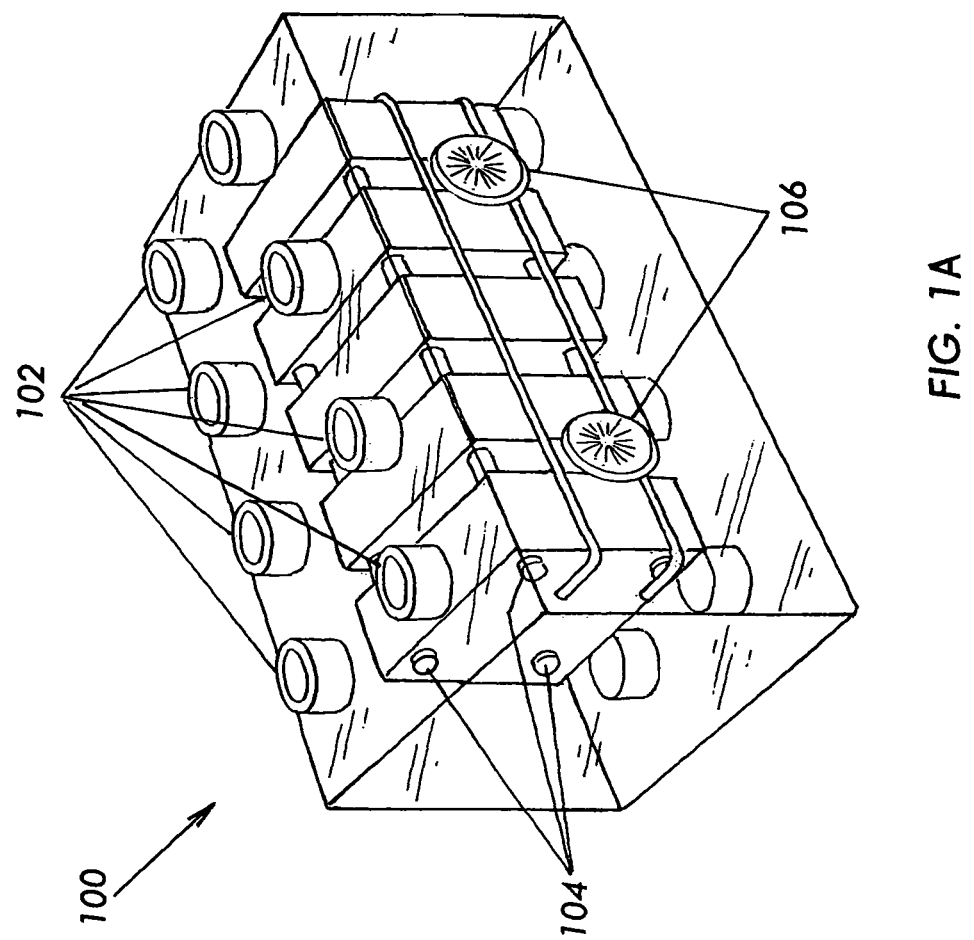
FIG. 1A is another perspective view of the hydrogen fuel cell unit shown in FIG. 1.

In accordance with the various embodiments described and illustrated herein, a portable and extremely durable energy source is provided that functions independently to produce, for example, electricity. Referring to the drawings, in which like reference numerals refer to like elements, there is shown in FIGS. 1 and 1A illustrations of the energy source and referred, generally, herein as hydrogen fuel energy unit 100. In the examples illustrated and described herein, hydrogen is the preferred element as a fuel source to be converted to electricity. It is envisioned herein, however, that alternative chemical elements may be used as fuel for electricity without departing from the spirit of the teachings herein. Thus, the use of the name hydrogen fuel energy unit 100 and the various examples included herein are exemplary, and not intended to be limiting exclusively to the use of hydrogen.

In a preferred embodiment, hydrogen fuel energy units 100 are provided in a rectangular brick-shape and, as described in greater detail below, have fuel cells that are stacked and embedded therein. Further, in a preferred embodiment, hydrogen fuel energy unit 100 of the teachings herein are made of a clear, transparent, or translucent material, such as Lucite. Of course, one skilled in the art will recognize that alternative shapes are envisioned herein, such as triangular, round or pyramidal. In one embodiment, hydrogen fuel energy units 100 can be combined to form a geodesic dome that may be integrated with an existing structure, such as a residential structure, or may be used to construct a structure (e.g., a residential structure). A geodesic dome, for example, provided with a residential structure or as a residential structure provides architectural benefits, as well. Further, alternative materials can be used to construct unit 100. Preferably, construction standards emerge in connection with various components associated with the structure, and one or more companies preferably contribute to build the respective components.

Figure 2:
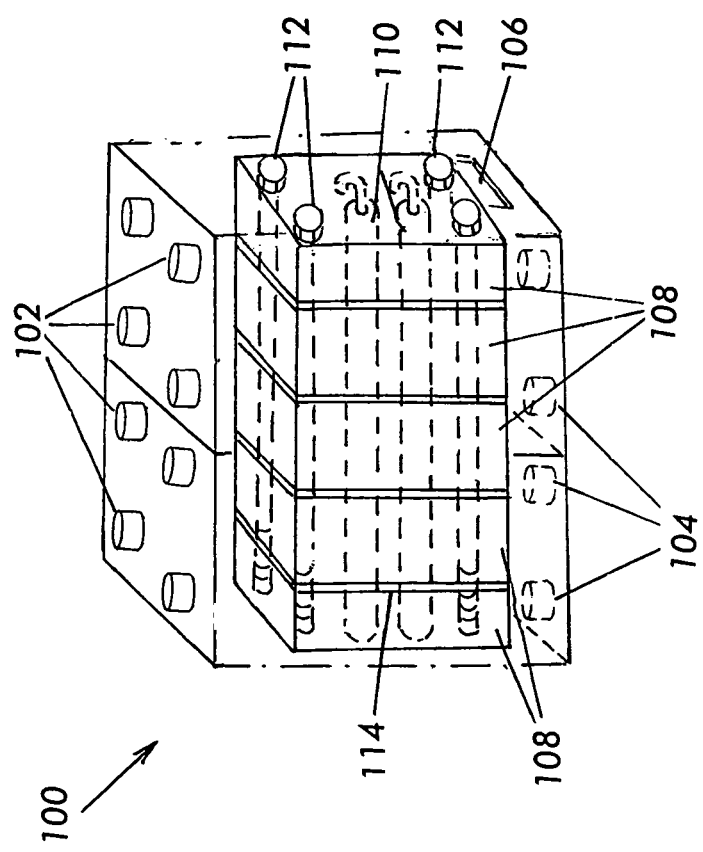
FIG. 2 is a perspective view and illustrates additional elements within a hydrogen fuel energy unit in accordance with a preferred embodiment.

Moreover, the individual units 100 of the energy source in accordance with teachings herein are preferably able to be stacked and interconnected to create a larger and more powerful energy source. Preferably, the interconnection is provided by simply mating two of the units 100 together. In one embodiment, studs 102 are provided on one end of the unit 100 and receptacle portions 104 to receive studs 102 are provided at another end of units 100. Also shown in FIGS. 1 and 1A, membrane 106 is preferably an air permeable membrane, such as Gore-Tex, that operates to filter water and other material, but passage and flow of oxygen into unit 100. In an alternative embodiment, membrane 106 is on two opposing long sides of the brick, as opposed to on the ends, as shown in the drawing. As known in the art, oxygen is used by hydrogen fuel cells during the production of electricity. A plurality of fuel cells are preferably provided within each hydrogen fuel energy unit 100, such as illustrated in FIG. 2.

In operation in a preferred embodiment, sunlight is converted to electricity in hydrogen fuel energy unit 100, for example, using a photovoltaic cell (not shown). In a preferred embodiment, hydrogen fuel energy unit 100 has mono-crystalline silica solar cells that are provided on the sides of unit 100. In one embodiment, solar cells are impregnated in the unit's 100 material, such as Lucite. Solar power technology that uses solar cells or solar photovoltaic arrays is preferably provided to convert energy from the sun into electricity. The electricity produced from the sunlight is used by a PEM (or other) electrolyzer within unit 100 to separate hydrogen from pure water or other source (e.g., metal hydride). Therefore, hydrogen is produced from pure water as a function of electrolysis. The hydrogen is converted into electricity, for example, using one or more fuel cells, in which the hydrogen is recombined with oxygen to produce electricity.

As described in more detail below, hydrogen fuel energy unit 100 preferably operates to collect hydrogen for eventual conversion to electricity, or operates to convert hydrogen to electricity. In a preferred embodiment, unit 100 does not operate to collect hydrogen and provide electricity simultaneously. Accordingly, hydrogen fuel energy unit 100 preferably includes a switching mechanism that causes unit 100 to operate in a hydrogen collection mode (i.e., during electrolysis) or in an electricity providing mode. In one embodiment, the switching mechanism is a pressure sensitive switch that senses when a predefined buildup of hydrogen has been collected, and switches unit 100 from collecting hydrogen to provide electricity therefrom. In alternative embodiment, switching mechanism recognizes when a water level has reached a predefined position, thereby indicating an amount of hydrogen, and switches unit 100 from collecting hydrogen to providing electricity, and vice-versa. Therefore, unit 100 preferably alternates between hydrogen collection mode and electricity generation mode, and operates accordingly as a function of the switch.

In an embodiment, a switch mechanism that causes unit 100 to operate in a hydrogen collection mode or in an electricity providing mode is formatted as an air pressure switch. As hydrogen is being produced, for example, during electrolysis, pressure in fuel energy unit 100 increases. The pressure increase causes the switch to activate, preferably after a predefined pressure is reached. Thereafter, as pressure reduces as a function the production of electricity, the switch is again activated and fuel energy unit 100 reverts to a mode for the production of hydrogen.

During the production of electricity, pure water is a natural byproduct, and the water is channeled back into hydrogen fuel energy unit 100 for future use during electrolysis. Thus, in accordance with a preferred embodiment, hydrogen fuel energy unit 100 collects sunlight and converts the sunlight to electricity. That electricity is used to convert water to hydrogen during electrolysis, and electricity is produced from the hydrogen. Water is a natural byproduct during the production of electricity, and used for future electrolysis.

During the production of electricity, for example, some water may not condense to be used for the production of hydrogen during electrolysis, and instead escapes through membrane 106. Accordingly, pure water may be added to unit 100 in order to restore the unit's efficiency and to increase electricity production and the longevity of unit 100.

In one embodiment, receptacle portions 104 are provided within unit 100. Preferably, studs 102 are slightly larger in diameter than that of receptacle portions 104. When two hydrogen fuel energy units 100 are pressed together, the studs 102 are received by the receptacles portions 104, and the studs 102 are essentially pressed into and around the receptacle portions 104. The receptacle portions 104 are preferably fashioned with a resilient material, such that portions of receptacle 104 press against the studs 102. Thus, friction prevents two hydrogen fuel energy units 100 from coming apart. The result is a coupling of a plurality of hydrogen fuel energy units 100 as a function of friction and without a requirement for glue, or other type of fastener. Similar structures are known, such as provided in the known children's toy, LEGO.

In a preferred embodiment, studs 102 and receptacles 104 are formed of a conductive material. Accordingly, studs 102 and receptacles 104 preferably operate as electric contact points between a plurality of hydrogen fuel energy units 100.

FIG. 2 is a perspective view and illustrates hydrogen fuel energy unit 100 that houses five stacked fuel cell elements 108, in accordance with a preferred embodiment. Each fuel cell 108 preferably includes a metal plate (not shown) that may be constructed of a hard metal, such as platinum, to operate as the proton exchange-membrane during electrolysis.

Continuing with reference to FIG. 2, a plurality of tubes 110 store water and/or hydrogen. As hydrogen is formed during electrolysis, the hydrogen preferably replaces the water in the tubes 110. In the example shown in FIG. 2, fuel cells 108 are held in place by screw members 112. Also in the example shown in FIG. 2, electrolytic membrane 114 is shown for each fuel cell in fuel cell stack. In FIG. 2, four fuel cells are shown and stacked together. Preferably, fuel cells are joined together such that they receive water for electrolysis from the same source, produce hydrogen to the same source, and draw hydrogen from the same source to produce electricity. One skilled in the art will recognize that alternative means of holding fuel cells 108 in place is envisioned herein.

Over time, hydrogen fuel energy unit 100 may require maintenance. For example, to improve the efficiency of unit 100, pure water may be added. Moreover, membrane 106 may eventually require replacement in order to improve the ability for unit 100 to receive oxygen and/or filter out water. In one embodiment, an access is provided, such as a boltable and/or removable panel or door, with unit 100 that enables access to membrane 106 and/or to enable a user to add water to unit 100. In this way, unit 100 is formatted with an access for maintenance.

Preferably, studs 102 and receptacles 104 of hydrogen fuel energy unit 100 are formed of conductive material to enable the hydrogen fuel energy units 100 to operate in tandem, and further to enable a user to define a particular polarity. By altering a hydrogen fuel energy unit's 100 polarity, a plurality of units can be connected in series, thereby increasing the overall voltage output. Alternatively, a plurality of bricks can be connected in parallel, thereby increasing the overall amperage.

Figure 3:
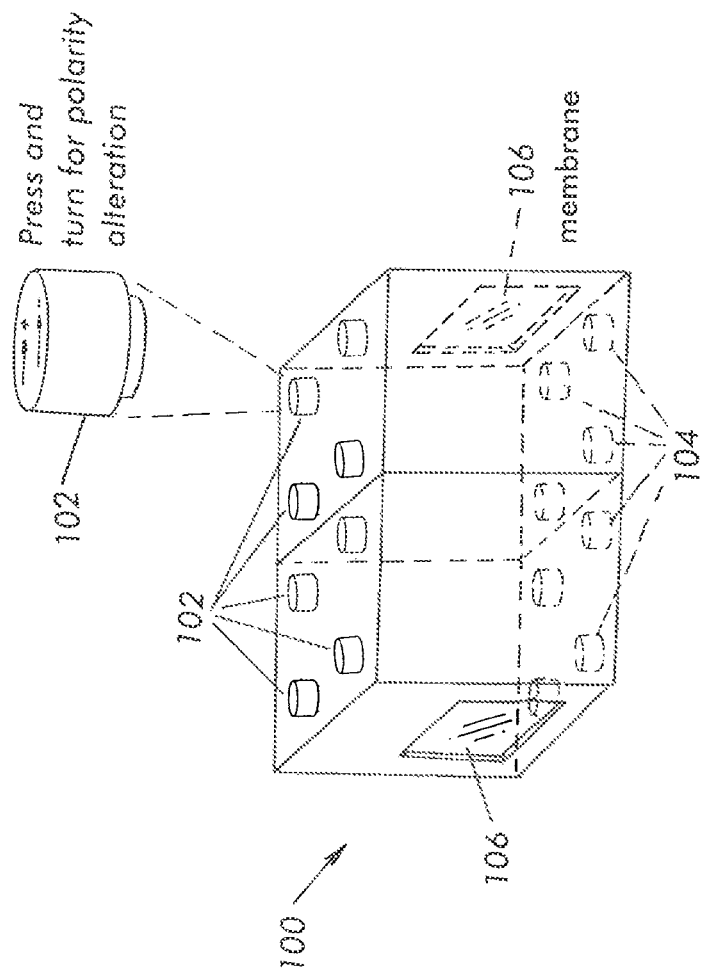
FIG. 3 is a perspective view and shows the hydrogen fuel energy unit of FIG. 1, and further illustrates a polarity alteration member included in the energy unit.

FIG. 3 is a perspective view illustrating hydrogen fuel energy unit 100, and further illustrates a polarity alteration member preferably included in stud 102. Preferably, stud 102 is provided such that polarity can be altered by a user by simply pressing and turning stud 102 in a respective position. For example, turning stud 102 in clockwise rotation selects a negative polarity, while turning stud 102 in a counter-clockwise rotation selects a positive polarity. Alternative embodiments are envisioned herein. For example, stud 102 is provided with a first end and a second end, and stud 102 may be removable. In this alternative embodiment, a respective polarity may be selected by the user inserting a respective end (i.e., first end or second end) into receptacle portion 104. In yet another alternative embodiment, a switching member may be provided with stud 102 and/or receptacle 104 that enables a user to select a respective polarity.

Enabling a user to switch polarity is a significant feature of the teachings herein as it enables a user to operate a plurality of hydrogen fuel energy units 100 in series or in parallel. Thus, such as batteries (e.g., AAA batteries, AA batteries or the like) in a respective battery compartment, units 100 can operate in series or in parallel.

Figure 4:
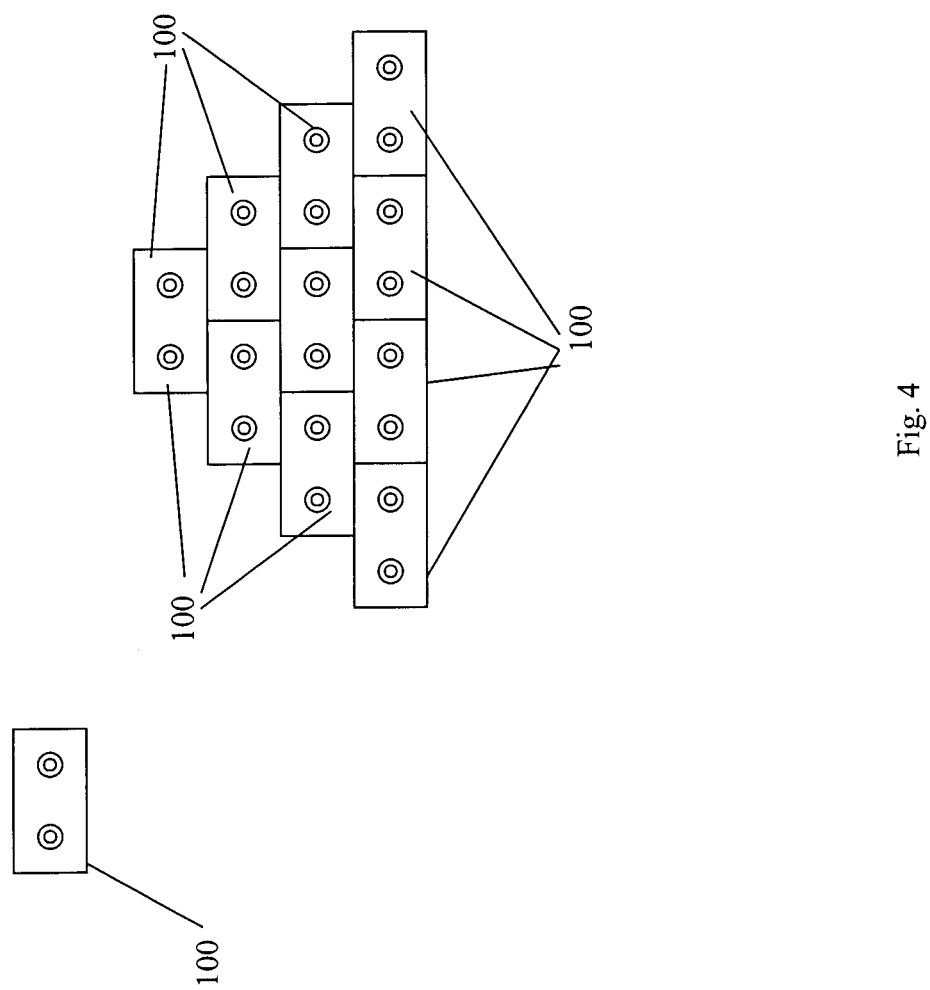
FIG. 4 illustrates ten individually placed hydrogen fuel energy units that are operable to produce electricity.

FIG. 4 illustrates a stack of ten hydrogen fuel energy units 100. In the example shown in FIG. 4, the units 100 operate independently, and each unit 100 is preferably operable to produce 15 volts and 50 watts of power.

Figure 5:
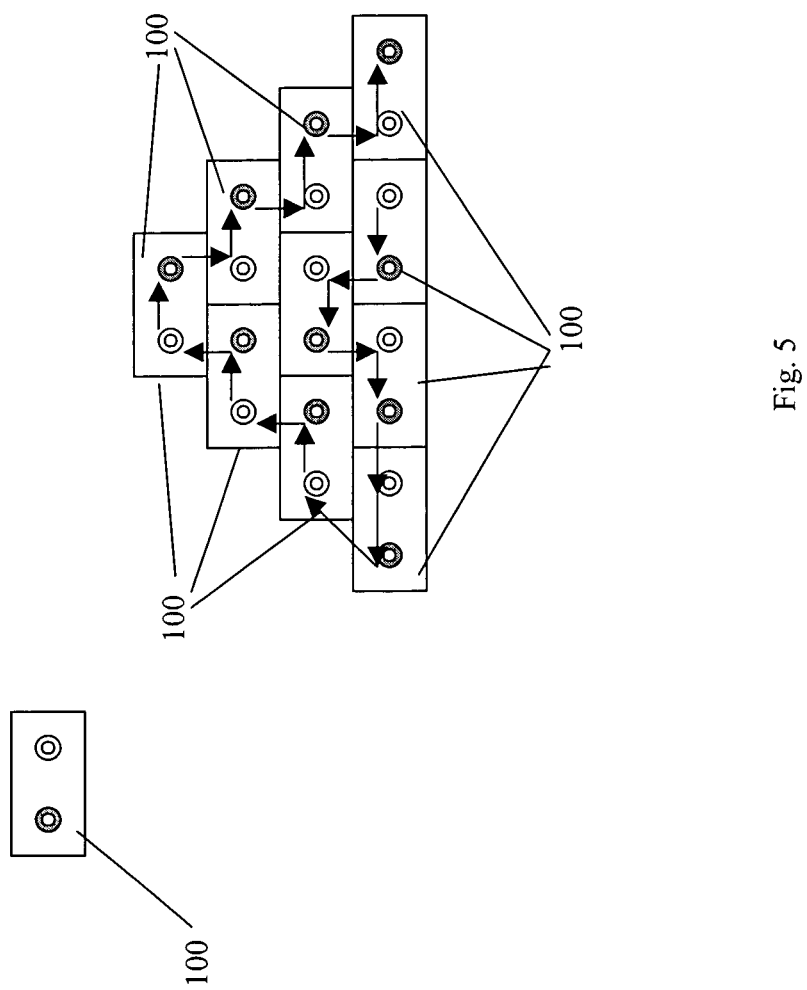
FIG. 5 illustrates the ten hydrogen fuel energy units of FIG. 4 that are connected in series.
Figure 6:
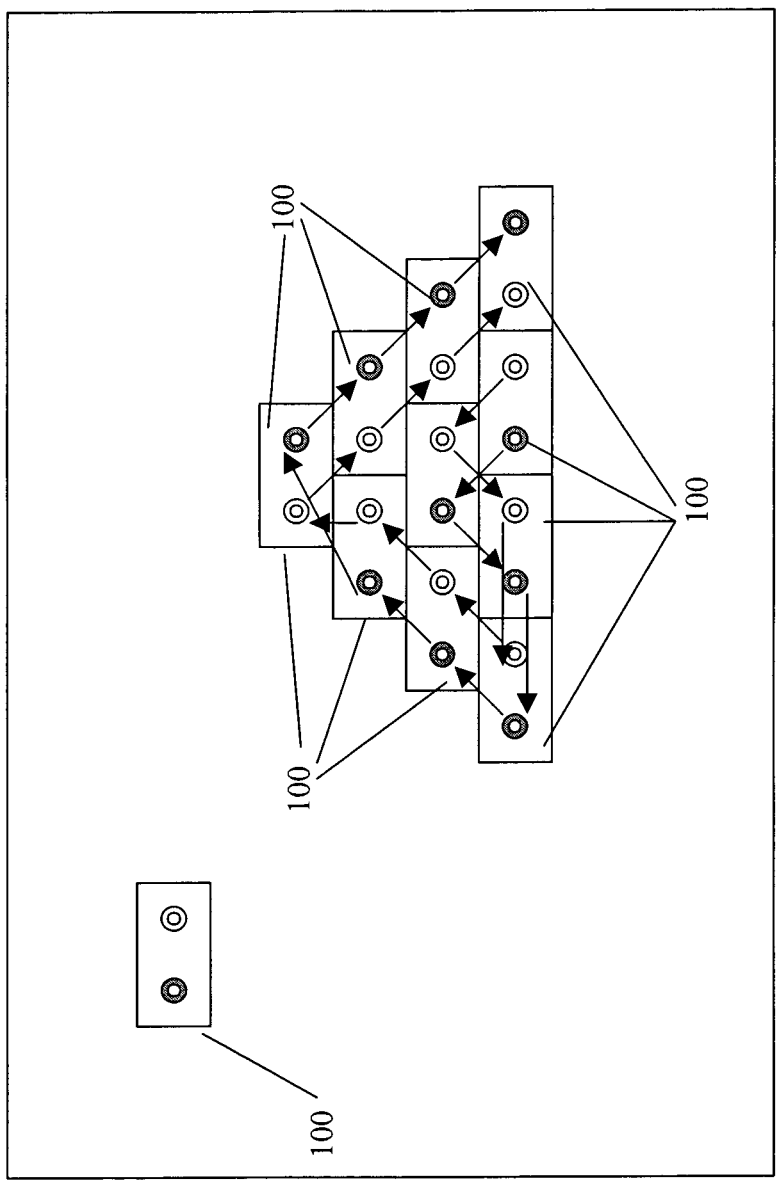
FIG. 6 illustrates the ten hydrogen fuel energy units of FIG. 4 connected in a parallel stack.

FIGS. 5 and 6 illustrate a respective connectivity of a plurality of hydrogen fuel energy units 100 in order to provide varying electrical voltage and amperage. FIG. 5 illustrates ten hydrogen fuel energy units 100 that are connected in series, for example, as a function of the polarity setting, as described above. In the example shown in FIG. 5, ten hydrogen fuel energy units 100 are connected in series to produce 150 volts and 50 watts of power.

FIG. 6 illustrates ten hydrogen fuel energy units 100 that are connected in a parallel stack, for example, as a function of a respective selected polarity. In the example shown in FIG. 6, ten hydrogen fuel energy units 100 are connected in a parallel stack to produce 15 volts and 500 watts of power.

Thus, as indicated in the FIGS. 5 and 6, connecting and operating a plurality of hydrogen fuel energy units 100 in tandem serves to increase the amount of electricity that can be produced. Further, voltage or amperage can be respectively increased as a function of connecting the hydrogen fuel energy units 100 in series or in parallel.

It is envisioned herein that the plurality of hydrogen fuel energy units 100 operate over time to produce significant amounts of electricity. In general, it is believed that there is an optimal 2.5:1 ratio of time required for producing hydrogen (e.g., during electrolysis) to the time in which electricity, as in line voltage, is provided. For example, four and one half hours of collecting sunlight and producing hydrogen results in, generally, one hour of converting the hydrogen to electricity as an electrical supply. Of course, one skilled in the art will recognize that various environmental and/or external factors may affect this performance ratio. For example, in case sunlight is not available during a long stretch of overcast days, or in case unit 100 becomes dirty over time, the ratio may be much higher, such as 5:1, thereby temporarily decreasing the overall efficiency of unit 100. As improvements in known solar panel technology and fuel cell technology emerge, including with regard to the polymer membrane, the charging efficiency and electricity production of fuel cell unit 100 improve.

In one embodiment, the plurality of hydrogen fuel energy units 100 can operate successively over time to enable a regular supply of electricity. For example, a first two of ten hydrogen fuel energy units 100 supply electricity for one hour while the remaining eight units 100 collect and store hydrogen. A second two of the ten units 100, thereafter, provide electricity for one hour. Thereafter, a third two units 100 provide electricity for an hour, thereafter the fourth two units 100 provide electricity, and, thereafter, the remaining two units 100 provide electricity. Thereafter, the cycle beings again. In this way, a regular supply of electricity is provided without interruption, as most units 100 collect and store hydrogen while other units 100 supply line voltage. In one embodiment, unit 100 is provided with processing capability, preferably, comprising one or more circuits and switches (not shown), as known in the art that enables the control for successive operation of a plurality of units 100 to provide a regular supply of electricity over time.

Further, it is believed that voltage and amperage is better controlled with hydrogen-based electricity than that provided, for example, from photovoltaic processes. By converting hydrogen to electricity, the teachings herein preclude the requirements for additional components, such as rectifiers and other equipment, known in the art as line conditioning, that may be required for purifying output line voltage. In other words, the voltage condition is improved as a function of the converted hydrogen electricity.

It is envisioned herein that the solutions provided herein are particularly useful for hydrogen powered requirements that have humanitarian, educational, and commercial value. The hydrogen fuel energy units 100 represent a portable and extremely durable energy source that function independently and that also can be stacked and interconnected to create a larger energy source. One example use of the electricity that is produced by the teachings herein include running a well in a remote location with little supervision. Thus, a high technical and sophisticated solution that is relatively simple to implement can be provided for in low technical scenarios.

Further, the teachings herein preferably regard the development and mass production of the hydrogen fuel energy units 100 such that the hydrogen fuel energy units 100 convert sunlight into DC power. The hydrogen fuel energy units 100 can sustain long periods of abuse and neglect, and can be easily stacked to increase their power, such as illustrated in FIGS. 1-6. Further, the hydrogen fuel energy units 100 can be structured in combinations of series and parallel circuits to either increase the combined voltage or increase the combined amperage. Among countless other uses, a small retaining wall of hydrogen fuel energy units 100 is useable, therefore, to power a well in a remote location. The humanitarian benefits of the teachings herein are evident, therefore, to one skilled in the art.

In another example application and embodiment, an outdoor concert venue is provided that is powered by hydrogen fuel energy units 100. In this example embodiment, the components of the system, including solar driven electrolysis, low pressure hydrogen storage, and fuel cells are all constructed in a clear Lucite medium which allows for the power source to become part of the entertainment and art and draws a new level of attention to the possibilities. The hydrogen fuel energy units 100 power many (if not all) elements of the venue, including, for example, the stage, lights, concessions, and even transportation units, such as golf carts. A benefit of the teachings herein is that the electricity is produced in a clean manner, and because the hydrogen fuel energy units 100 are clear, educational benefits are provided, as well. By bringing hydrogen fuel energy units 100 to a site one or more days in advance, solar energy is collected to produce all the hydrogen necessary to supply electricity for the event. The venue may be stationary or mobile, depending upon its size and respective application. Other applications are envisioned herein, and can range from an individual podium to a large-scaled concert stage.

Further, the PEM fuel cells produce oxygen and water, which provide bubbles that travel down tubes and contribute to the overall aesthetics. Other aesthetically pleasing features are envisioned, including lighting hydrogen fuel energy units 100 using colored light, lasers or the like. In this way, various aesthetics are provided in addition to environmentally friendly and resource conservation features.

In another embodiment, an outdoor concert or other public gathering venue is powered by one or more hydrogen fuel sources without requiring the use of hydrogen fuel energy units 100. For example, a portable electrical supply source fueled by hydrogen is provided for supplying electricity to various devices required for a public venue. Alternatively, large-scaled hydrogen fueled electricity supplies may be provided for large and stationary public venues.

Moreover, a development of a method and mode to promote mass production of construction elements (such as shingles, siding, paver bricks, and insulation) that work together to provide an energy source. This is preferably done in a cellular automata manner. In other words, multiple simple machines work together to form a complex machine. In this way, each product is stackable in numbers in a simple manner increases each product's function. Hence each product type unites to form one "machine" providing a given function. (i.e. all shingles working together to collect sunlight). Moreover, each separate little machine combines with other little machines to create a larger more complicated machine that provides energy. This is such as solar collection, hydrogen production, and electricity production and storage. As known in the art, cellular automata involves individual machines operating together to form a more complicated machine. This preferably tessellates. In one example each of a plurality of solar shingles are installed in a roof, and work together to generate electricity. The electricity generated on the roof acts as part of a "fuel cell house."

Additionally, hydrogen fuel cell unit 100 may be provided as a freely distributed standard for construction that provides for multiple manufacturers to make products that "snap"

together in the cell structure and provide energy. This may result in a society and consortium that maintains communication among manufacturers and vendors to ensure the success of the combined efforts. Further, the teachings herein provide an ability to build a home where much of the construction components conspire together to generate and store power. For example, carbon fiber is operable for hydrogen collection and house insulation. Solar cells are operable to assist with electrolysis, and as shingles.

The electricity production mode of fuel cell unit 100 is exothermic, whereby heat dissipates from the plate and the water via the membrane, which acts as a vent. Hence, fuel cell unit 100 ventilates heat, which can be directed through one or more membranes. Further, fuel cells are provided as energy sources and as window material. In an embodiment, fuel cell units 100 are constructable to release heat generated during the electricity production phase in a predetermined direction. Thus, a window comprising one or more fuel cell units 100 enable a flow of heat inwardly, thereby heating a structure, such as a house, and providing other emergency and humanitarian solutions.

It is believed by the inventor that there is a receding of snow in Alaska directly due to increased surface area of blacktop driveways and streets, since the radiant heat is held and then returned later. In the event that blacktop contains gallium crystals, (most likely mono-crystalline silica or any photo electric crystal), then by the laws of conservation of energy, all the energy collected for electricity could be reducing the heat energy from the blacktop, which is presently harming the environment. The more that construction products operate to convert collected radiant energy into solar electric energy, the less that the products will contribute to global warming otherwise caused by radiant energy that is returned into the atmosphere at night. In this way, virtually every dark man made surface can be used to contribute to the environment instead of harming it by way of global warming.

Although the teachings herein are described and shown in relation to particular embodiments thereof, many other variations and modifications and other uses will become apparent to those skilled in the art. It is preferred, therefore, that the present invention be limited not by the specific disclosure herein.

What is claimed is:

1. An energy system comprising:
   at least a first energy unit and a second energy unit, each energy unit configured to store water and hydrogen, each energy unit comprising
   at least one fuel cell, the fuel cell comprising
   (i) an electrolyzer,
   (ii) an electrical source operable to provide a current to the electrolyzer to dissociate the water into hydrogen and oxygen,
   (iii) a tube to collect the hydrogen from the dissociated water,
   (iv) a stud having a vertical axis and coupled to the fuel cell and a receptacle coupled to the fuel cell, wherein the stud and the receptacle each is formed of an electrically conductive material;
   each stud is centered about its vertical axis and is individually rotatable about said vertical axis and each stud is rotatable within the energy unit between a first position that is a positive polarity and a second position that is a negative polarity; and
   a receptacle from the first energy unit operably receives a stud from the second energy unit to join the first energy unit and the second energy unit, enabling the first energy unit and the second energy unit to operate in tandem and generate electricity using the hydrogen.

2. The energy system of claim 1 wherein each energy unit comprises at least two studs and at least two receptacles, each receptacle receiving a respective stud; and
   one stud is rotated to the first position for positive polarity and another stud is rotated to the second position for negative polarity.

3. The energy system of claim 2 wherein the energy units are operable in parallel.

4. The energy system of claim 2 wherein the energy units are operable in series.

5. The energy system of claim 1 wherein each energy unit is bricked-shaped and the stud is on a top side of the brick and the receptacle is on a bottom side of the brick.

6. The energy system of claim 5 comprising an air permeable membrane on a side of the brick that is void of the stud or void of the receptacle.

7. The energy system of claim 1 wherein each energy unit comprises a switching mechanism that causes the energy unit to operate in a hydrogen collection mode and an electricity providing mode.

8. The energy system of claim 7 wherein the switching mechanism is a pressure sensitive switch that senses when a predefined buildup of hydrogen has been collected and switches the energy unit from collecting hydrogen to providing electricity.

9. The energy system of claim 7 wherein the switching mechanism recognizes when a water level reaches a predefined level and switches the energy unit from collecting hydrogen to providing electricity.

10. The energy system of claim 7 wherein the switching mechanism is an air pressure switch.

11. The energy system of claim 1 wherein the electrolyzer is a metal plate.

12. The energy system of claim 1 wherein the electrolyzer is a proton exchange-membrane, (PEM).

13. The energy system of claim 1 wherein the tube stores water and hydrogen.

14. The energy system of claim 1 wherein the hydrogen replaces the water in the tube as the hydrogen is formed during electrolysis.

* * * * *